United States Patent
Hormozdyaran (10) Patent No.: US 11,546,510 B2
(45) Date of Patent: Jan. 3, 2023

(54) CONVEX INTEGRATED VEHICLE INSPECTION AND SECURITY SYSTEM

(71) Applicant: Tahmoures Hormozdyaran, Centreville, VA (US)

(72) Inventor: Tahmoures Hormozdyaran, Centreville, VA (US)

(*) Notice: Subject to any disclaimer, the term of this patent is extended or adjusted under 35 U.S.C. 154(b) by 0 days.

(21) Appl. No.: 17/248,440

(22) Filed: Jan. 25, 2021

(65) Prior Publication Data

US 2021/0235015 A1 Jul. 29, 2021

Related U.S. Application Data

(60) Provisional application No. 62/965,433, filed on Jan. 24, 2020.

(51) Int. Cl.
*H04N 5/232* (2006.01)
*G02B 5/10* (2006.01)
*H04N 5/445* (2011.01)
*H04N 7/18* (2006.01)

(52) U.S. Cl.
CPC .......... *H04N 5/23238* (2013.01); *G02B 5/10* (2013.01); *H04N 5/445* (2013.01); *H04N 7/183* (2013.01)

(58) Field of Classification Search
CPC .......... G02B 26/10; G02B 5/10; G02B 7/182; H04N 5/23238; H04N 5/247; H04N 5/445; H04N 7/183
See application file for complete search history.

(56) References Cited

U.S. PATENT DOCUMENTS

| | | | | |
|---|---|---|---|---|
| 8,305,442 B2* | 11/2012 | Millar | ........... | G06K 9/00577 348/148 |
| 2003/0098909 A1* | 5/2003 | Fritzsche | ........... | H04N 7/183 348/148 |
| 2006/0262190 A1* | 11/2006 | Millar | ........... | G06K 9/00577 348/148 |
| 2008/0136625 A1* | 6/2008 | Chew | ........... | G01V 5/0008 340/540 |
| 2009/0018721 A1* | 1/2009 | Mian | ........... | G06K 9/4604 701/31.4 |
| 2014/0236514 A1* | 8/2014 | Icove | ........... | G01V 3/15 702/65 |

(Continued)

OTHER PUBLICATIONS

"Under Vehicle Inspection System." https://web.archive.org/web/20190324044010/https://www.1vision.co.il/Under-Vehicle-Inspection-System-2. Mar. 24, 2019. (Year: 2019).*

(Continued)

*Primary Examiner* — Farzana Hossain
(74) *Attorney, Agent, or Firm* — Dunlap Bennett & Ludwig, PLLC (57) ABSTRACT

A convex integrated vehicle inspection and security system embodying a convex parabolic mirror placed at a 45-degree angle and operatively associated with an image capture device capable of capturing a series of image strips at frame rates of up to 900/second. The single image capture device collects light and images using the convex mirror such a way that the composite image of the image strips can be presented as a panoramic image, wherein the panoramic image is displayed as a rectangle where the horizontal direction represents the width of the undercarriage of the vehicle.

11 Claims, 7 Drawing Sheets

(56) References Cited

U.S. PATENT DOCUMENTS

| | | | |
|---|---|---|---|
| 2016/0150138 A1* | 5/2016 | Hauk | G03B 37/02 |
| | | | 348/121 |
| 2018/0349679 A1* | 12/2018 | Rozploch | G06K 9/00288 |
| 2019/0235126 A1* | 8/2019 | Petruk | G06T 7/162 |
| 2020/0322546 A1* | 10/2020 | Carolus | H04N 5/2254 |

OTHER PUBLICATIONS

Dickenson et al. "Mosaic Generation for Under Vehicle Inspection." https://www.researchgate.net/publication/220939391_Mosaic_Generation_for_Under_Vehicle_Inspection. Jan. 2002 (Year: 2002).*
Carroll, James Under-vehicle surveillance systems to identify potential threats beneath the automobile, https://www.vision-systems.com/home/article/16736116/undervehicle-surveillance-systems-identify-potential-threats-beneath-the-automobile. May 17, 2019. (Year: 2019).*

* cited by examiner

DETAIL A

CONVEX INTEGRATED VEHICLE INSPECTION AND SECURITY SYSTEM

CROSS-REFERENCE TO RELATED APPLICATION

This application claims the benefit of priority of U.S. provisional application No. 62/965,433 filed 24 Jan. 2020, the contents of which are herein incorporated by reference.

BACKGROUND OF THE INVENTION

The present invention relates to vehicle inspection security systems and, more particularly, a Convex Integrated Vehicle Inspection and Security System (C-IVISS).

In the field of security dealing with the inspection of vehicles, especially the undersides of vehicles, it is well known to raise the vehicle up off the ground through use of a hydraulic lift. However, hydraulic lifts are expensive and require the vehicle to be motionless, and thus hydraulic lifts are prohibitively expensive and/or impractical solutions for many situations where vehicle inspection is needed. Yet another form of underside vehicle inspection involved an inspector manipulating an elongated pole with a mirror and/or image-capturing devices along the underside of the vehicle. These mirror-on-a-stick approaches can be labor intensive and difficult to use on vehicles with little clearance between the underside of the vehicle and the driving surface. Furthermore, mirror-on-a-stick approaches also require the vehicle to come to a complete stop, precipitating delays at checkpoints. Finally, mirror-on-a-stick approaches do not lend themselves so repeatable, accurate results. As an alternative to all the above, many Vehicle Inspection and Security Systems (VISS) provide a drive-over scanning unit, known as Under Vehicle Inspection and Security Systems (UVISS). The UVISS do not require the vehicle to come to a complete stop and can produce repeatable results that can be automated.

Most mirror based UVISS in the market are utilizing straight mirrors. The size and weight of these straight mirrors make the scanning units heavy and bulky, which is disadvantageous for portable systems. Straight-mirror scanning units also require intensive demolition and/or construction when used as a fixed, ground unit.

Furthermore, current UVISS systems are based on making a composite image from multiple image capture devices, which is needed to cover the full width of the inspected vehicle. For example, with straight mirrors, or multiple camera—a plurality of overlapping still photographs may be taken by different cameras offset by predetermined degree intervals. These photographs are developed, digitized and then fed into a semi-automated software program called a "stitcher" that merges the overlapping still photographs into one long quasi-panoramic strip. The straight mirror solution makes the unit very bulky and heavy and expensive to install. Moreover, the stitching of multiple captured images results in a suboptimal composite image, and a long time to stitch all the images together.

Moreover, stitching together the reference image (generating a composite image from a plurality of captured images) with multiple camera images is time consuming and causes backups and delays at security check points, which are an inherent bottle neck to begin with. Additionally, comparing a composite image with a reference image, where the composite image is stitched together from images from the plurality of cameras is also not very accurate as the constituent images are not sharp enough to provide distinct boundaries.

In sum, UVISS devices in the market for inspecting the underside of a vehicle are either employing multiple cameras and/or straight mirrors. The multiple camera scanning unit causes time-consuming, imprecise composite image generation. The straight mirror scanning units make the units very bulky and heavy, making it difficult to manage and use as portable units, and storage is also difficult due to size. Furthermore, the UVISS devices with a single camera have more accurate, sharper composite images.

As can be seen, there is a need for a Convex Integrated Vehicle Inspection and Security System (C-IVISS). The C-IVISS unit embodied in the present invention incorporates a convex mirror and high-speed camera operatively associated thereto, improving the outputted composite image that is high-resolution and operable at much higher vehicle speeds compared with the prior art. The size and weight of the present invention is reduced drastically, compared to the prior art, making it lightweight and portable. A single image stitched from the one camera is a better representation of the underside of the vehicle, as compared to the composite images generated by way of the straight mirror and multiple camera solution. As a result, inspection for foreign objects becomes more accurate and faster. If any object is detected the security personnel is alerted for further investigation. The system of the present invention is an Internet Protocol (IP) based solution which makes it easy to manage and configure via internet. At the same time, the high-speed camera and the convex mirror provides the capability of capturing accurate images of the vehicle under carriage at high speed.

In sum, a convex mirror and operatively associated single high-speed camera makes the scanning unit much smaller in size and weight and results in more accurate, quickly generated composite and stitched images of the underneath of the vehicle. As a result of superior reference images, better image comparisons can be used for detection and identification of doubtful, deceptive, non-essential objects. High-speed generation of reference images prevent delays at security check points.

Likewise, using a single convex mirror that covers the complete width of a vehicle in a smaller footprint than the prior straight mirror-based solutions, reduces the size and weight of the scanning unit, making it easier to manage such solutions. Additionally, the cost of installation along the driving surface is also reduced.

SUMMARY OF THE INVENTION

In one aspect of the present invention, a vehicle inspection system includes the following: an enclosure having a single image capture device collecting light from a convex mirror, wherein the enclosure is dimensioned to occupy a space between an undercarriage of a vehicle and a surface supporting the vehicle, wherein the convex mirror is oriented at a forty-five degrees angle relative to the surface, wherein the single image capture device captures a series of image strips at a frame rate of up to 700/second, wherein the series of image strips are represented on a user interface as a composite panoramic image displayed as a rectangle where the horizontal direction represents a width of said undercarriage, wherein the user interface juxtaposes a reference panoramic image adjacent to the composite panoramic image, wherein the single image capture device is at a leading end of the enclosure and the convex mirror is at a trailing end of the enclosure; a ramp on each side of the enclosure; a driver image provide on the user interface adjacent the composite panoramic image; a license plate image on the user interface adjacent the composite panoramic image; a scene image provide on the user interface adjacent the composite panoramic image.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 7:
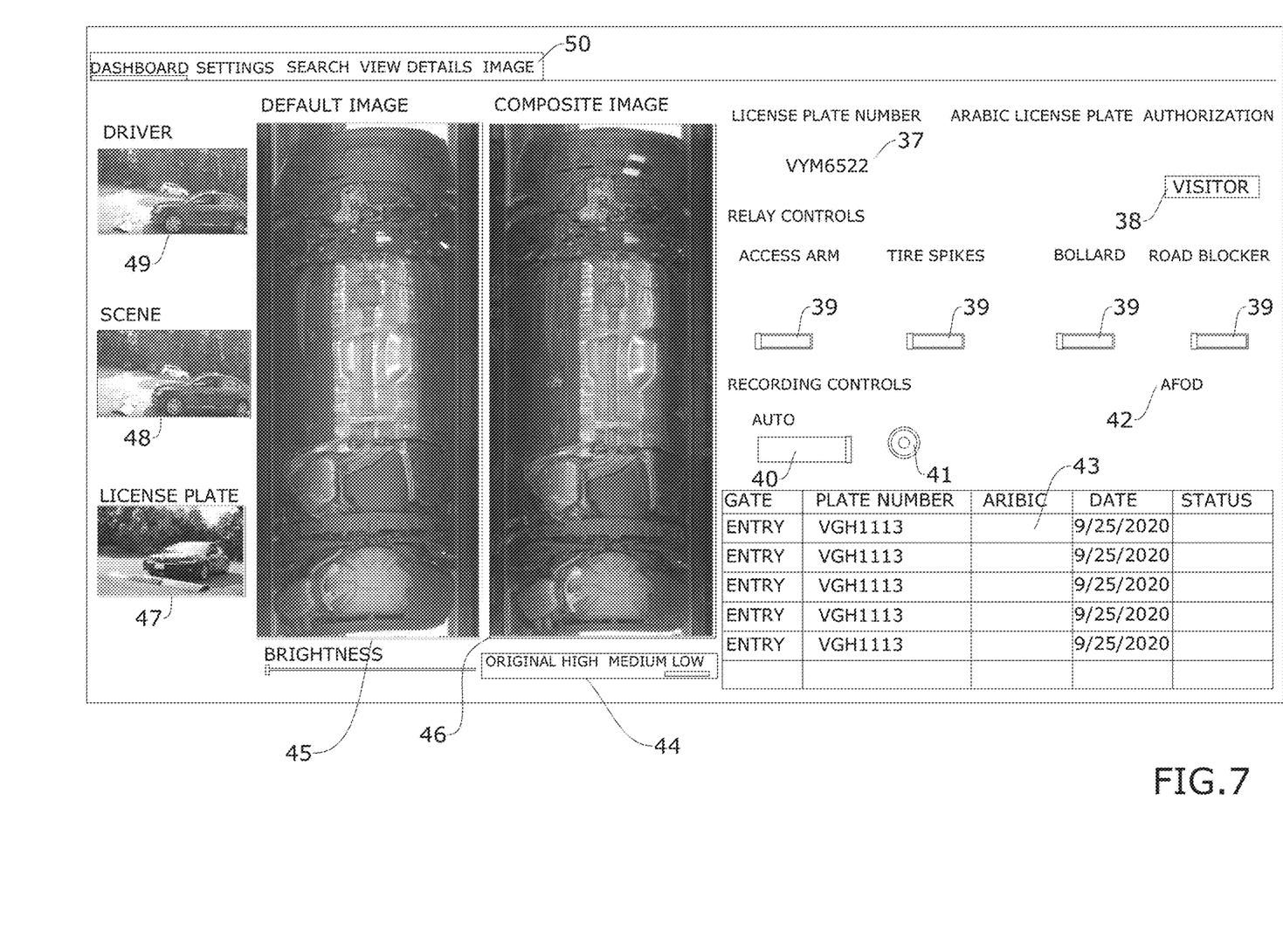
FIG. 7 is a schematic view of an exemplary embodiment of the present invention, illustrating the main user interface layout.

Referring now to FIGS. 1 through 7, the present invention may include a Convex Integrated Vehicle Inspection and Security System (C-IVISS) for inspecting the underside of passing vehicles. The present invention embodies an underside enclosure 4 housing a single image capture device 10 operatively associated with a convex mirror 1 for capturing an image strips from the convex mirror of the entire underside of a vehicle passing over the underside enclosure 4. The single image capture device 10 of the present invention collects light and images using the convex mirror 10 for presenting the captured image as a rectangular panoramic image, as shown in FIG. 7. The most common method of displaying a panoramic image is to display the image as a rectangle where the horizontal direction represents the width of the undercarriage of the vehicle and vertical the length and the direction the vehicle travelling.

The underside enclosure 4 may have a ramp 9 on each side, wherein the ramps 9 are dimensioned and adapted to engage the wheels of the vehicle. A bottom surface of the ramps 9 may be placed on the supporting surface also supporting the scanner/underside enclosure 4. Accordingly, the use of the scanner/underside enclosure 4 need not require excavation of the supporting surface on which the vehicle travels in order for the present invention to be used. In fact, above ground mounting brackets 34 may be all that is needed to make the scanner/underside enclosure 4 structurally secure.

The scanner/underside enclosure 4 has a top surface, a bottom surface, the two side surfaces the ramps 9 are associated with, and a leading surface 11 (where the vehicle first passes over) and a trailing surface. The leading surface 11 may have padding. The top surface may include an access door 7 having transparent material 8, such as plexiglass, over the mirror 1 and removable plates 5 for access to the camera 10.

Figure 1:
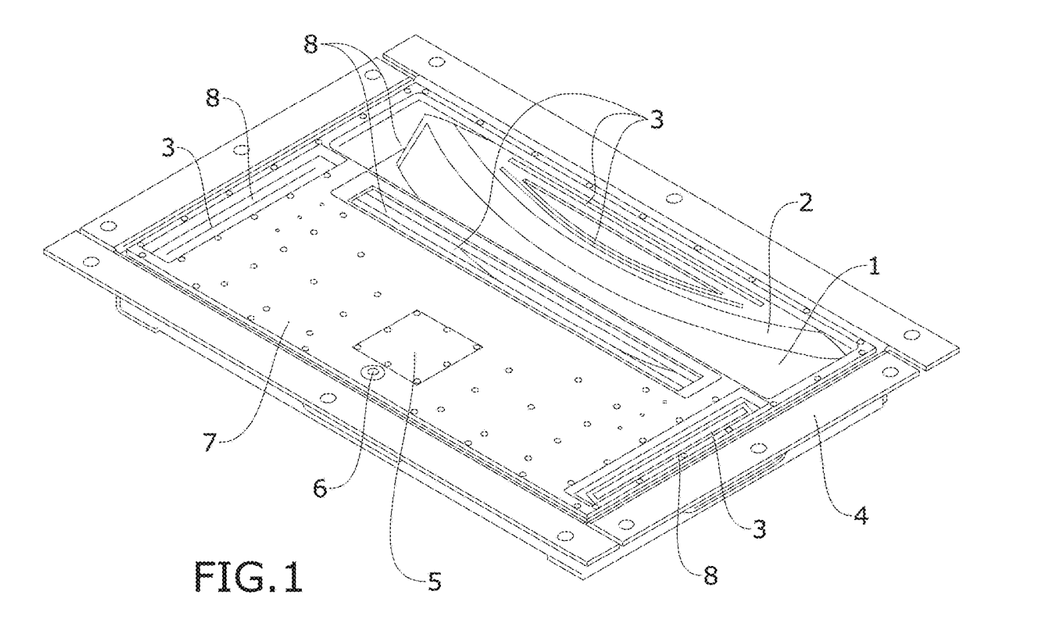
FIG. 1 is a perspective view of an exemplary embodiment of the present invention, illustrating a scanning unit and an inground frame.
Figure 2:
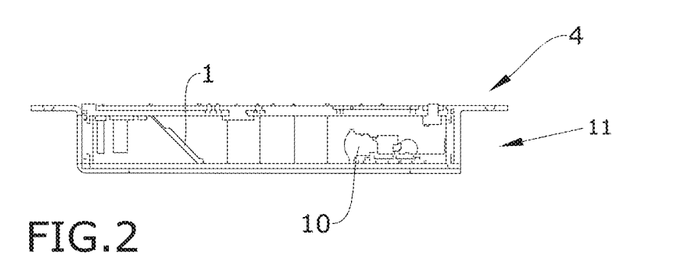
FIG. 2 is a cross sectional side view of an exemplary embodiment of the present invention.
Figure 3:
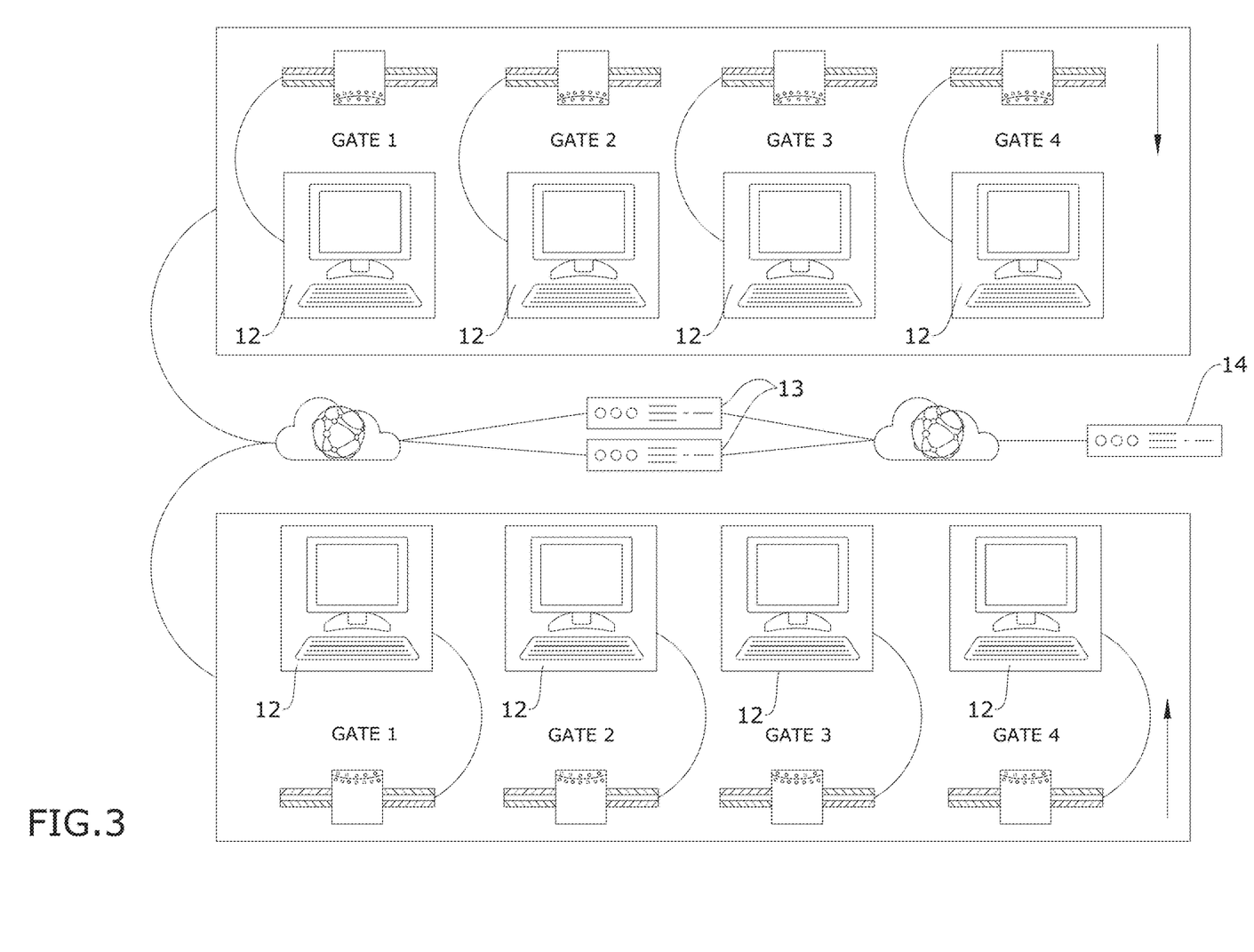
FIG. 3 is a schematic view of an exemplary embodiment of the present invention, illustrating a top level architecture of the units and FPU and servers for networked and cloud based solution.

In FIGS. 1 and 2, it is illustrated how the convex mirror 1 is installed on a mount 2 so that the reflective surface of the convex mirror 1 (at any cross-section thereof) defines an angle of incidence of approximately forty-five degrees (between forty and fifty degrees). The image capture device 10 may be a high-speed color camera directed toward the reflective surface which changes the direction of light upward normal to the angle of incidence. The convex mirror 1 is located proximate the trailing edge, while the image capture device 10 is proximate to the leading edge 11. The distance between the top and bottom surfaces provides a depth for the camera 10 to capture images of the undercarriage of the vehicle width and generate an accurate and sharp composite image. This convex mirror 1 approach reduces the overall size, width and weight of the scanner unit giving us an advantage over other scanners in the market.

Light sources 3, such as high-lumen LEDs, may be used to illuminate the undercarriage of the vehicle during the day and night. Special angles (between ten and twenty degrees—approximately 15 degrees) have been provided for the light sources 3 installed on the side to illuminate the wheel wells of the vehicle being scanned.

In FIG. 2, the image capture device 10 may have a maximum frame rate of 900 frames per second. The image capture device 10 may be configured to capture strips of images from the convex mirror 1. The FPU (Field Processing Unit) 12 stitches the strips of images to generate one single composite image of the scanned vehicle undercarriage. The high frame rate of the image capture device 10 enables the images to be captured with a vehicle moving at speeds up to 20 mph. The latest technology and digital processing power of the FPU 12 enables the images to be stitched in less than one second.

All power and control cables (such as the power cable 18 for the junction box 26 via power entry 31, an ethernet cable 19, a traffic light control and power cable 20, and ethernet cable 21 from the junction box 26) enter the underside enclosure 4 using waterproof connectors and glands 35. The cables are protected via cover channels 33 secured to the ramps 9 by fasteners 36. The current scanned vehicles composite image is displayed in window 46 of the system interface, as illustrated in FIG. 7. The algorithm for stitching and other logic for displaying and storing it in a database is managed by the C-IVISS FPU 12 which is the local processing unit. This data can be sent to the cloud 14 or local server cloud 13, which can manage multiple gates. The FPU 12 can also manage logic for other input peripherals like fingerprint scanners, RFID scanners, driver license reader 22. The FPU 12 also has logic to the identify threats and if threat status is determined after running the Automatic Foreign Object Detection (AFOD) 42. The dry contact remote relay 30 can be set using controls 39 configured to control external peripherals like access arms, bollards, road blockers, tire killers 23, etc., to allow or deny vehicle access to the premises.

Figure 4:
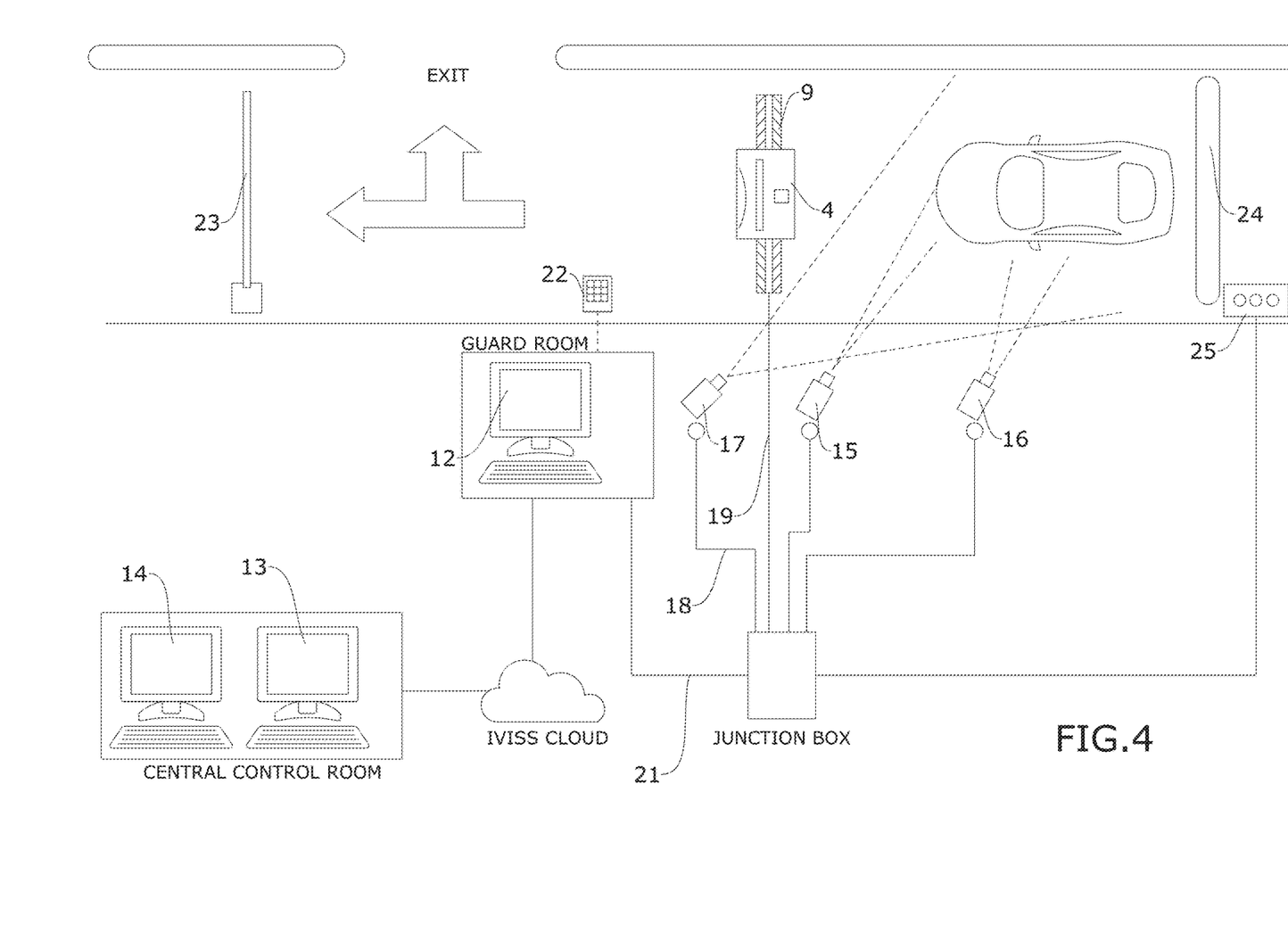
FIG. 4 is a schematic view of an exemplary embodiment of the present invention, illustrating a typical security gate layout.
Figure 5A:
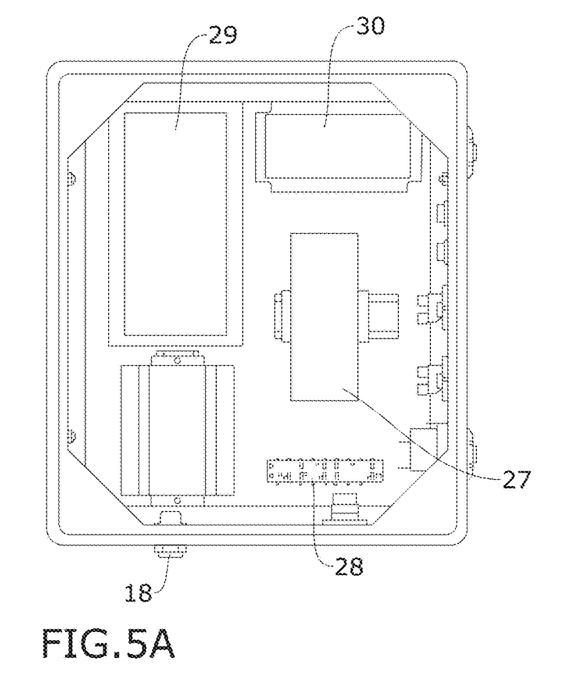
FIG. 5A is an internal view of an exemplary embodiment of a junction box of the present invention, illustrating a network switch 27, a power distribution strip 28, a scanning unit relay 29, and a remote relay 30.
Figure 5B:
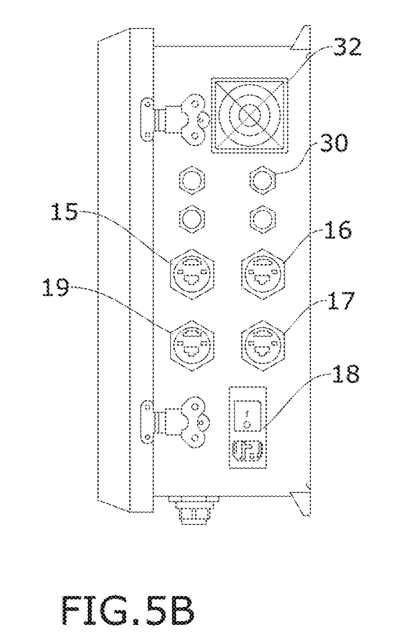
FIG. 5B is a perspective view of an exemplary embodiment of the junction box of the present invention, illustrating air cover slots 32.
Figures 6A, 6B, 6C:
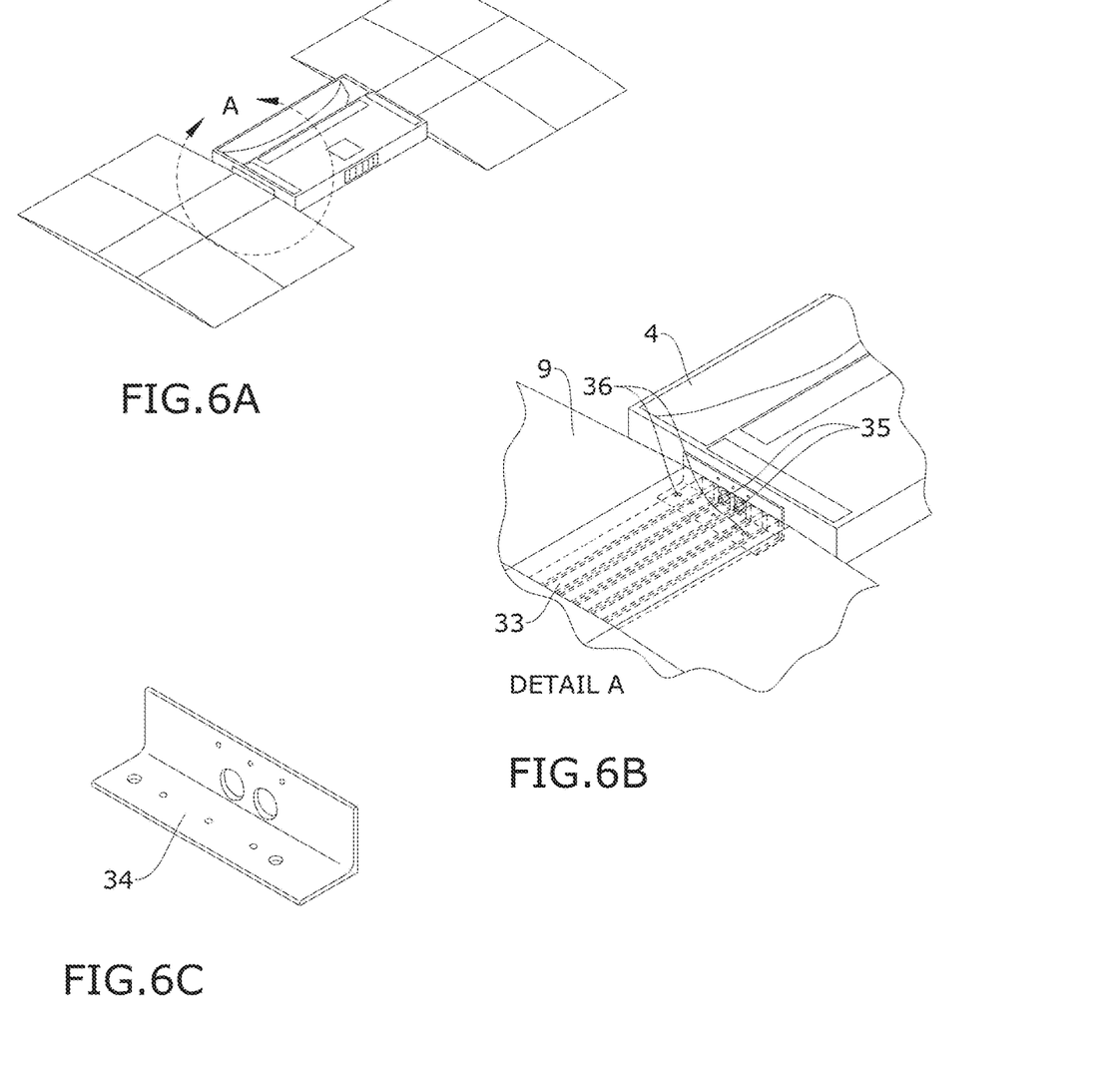
FIG. 6A is a perspective view of exemplary embodiment of a ramp and above ground bracket the present invention.
FIG. 6B is a detailed perspective view of exemplary embodiment of FIG. 6A, taken along line A.
FIG. 6C is a perspective view of exemplary embodiment of the present inventions above ground install bracket.

FIG. 4 is the typical security gate layout. The Automatic License Plate Reader (ALPR) camera 15 captures the license plate image which is converted by the ALPR camera 15 and the ALPR engine coverts it to OCR and saves it in the C-IVISS FPU 12 database. The license plate number is the primary key to the whole system to search, reports, queries and video analytics including Automatic Foreign Object Detection (AFOD) 42. A driver camera 16 captures the driver face image 49 which can be analyzed using facial recognition. All data and images captured are saved to the FPU 12 and if there is a central database for multiple gates it is transferred to C-IVISS Command Center 13 and 14. A scene camera 17 captures the surrounding area and the vehicle information like make, model and color displayed in 48. The ALPR camera 15, the driver camera 16, and the scene camera 17 may be infrared color cameras.

The FPU 12 has the capability of controlling the access arm, tire killer and other security peripherals through dry contact relays 30. Other biometric and RFID scanning device 22 can be integrated with the solution. For accurate start and stop of the scanner unit and all associated image capture, a sensor 6 is integrated in the scanner.

FIG. 4 is the top-level layout architecture of a typical physical gate providing security to a protected and secure installation or asset. The speed bump 24 is an optional speed reducing method prior to the vehicle approaching the scanner/underside enclosure 4. A sensor 6 may be integrated with the scanner/underside enclosure 4 which triggers the scanning camera 10 which captures the images off the convex mirror 1 for the creation of the composite image, it also triggers the driver camera 16, ALPR camera 15 and the scene camera 17 to capture their respective images 47, 48 and 49. Once the captured images strips from the convex mirror are stitched by the stitching algorithm and other logic on the C-IVISS FPU 12. The resulting composite image may be displayed as a single under vehicle image in window 46 and if a previous image 45 is available in the FPU database for the same license plate it will be displayed in window 45. The composition of these comparable images 45 and 46 and the level of AFOD is controllable by the selector 44. The vehicle data can be stored in the local database on FPU 12 or exported to and stored on the aggregate cloud server 13 and 14 via the internet. Multiple gate data can be stored on aggregate cloud server 13 and 14 and retrieved for analysis by the interface. The system has a manual option just in case the sensor does not work so that security does not stop which is set by 40. Once set to manual the record button 41 is activated. A drop-down menu 50 may be provided by the interface layout. The FPU 12 also has logic to analyze and identify threat analysis AFOD 42, and if no threat status is determined the vehicle is allowed in the premises or if determined it is denied access.

FIG. 7 is the software and user interface for the C-IVISS System, on capture of the images by camera 10 from the convex mirror 1, the software algorithm stitches the image and produces a single stitched and composite image 46 of the undercarriage of the vehicle being scanned for review and analyze. If the vehicle license plate is already registered the previous or the image which set as default image 45 for comparison for that license plate is displayed 45 and current scanned image 46 for comparison and analysis. If there is any discrepancy it is highlighted by the systems Automatic Foreign object detection (AFOD) algorithm 42.

The captured license plate image 47, the driver image 49, and the scene image 48 may be displayed via the main interface layout, thereby giving the user a "global" view of each vehicle.

Previous 9 Vehicle data may be displayed in window 43 of the interface layout, and if required can be selected for further analysis. The field 37 may display the license plate in characters and is editable. In certain embodiments, if the license plate is already in the database the field 38 is green and displays employee, if it is not in the database the field is yellow and displays visitor and if the license plate is in the black-listed or unauthorized database it displays unauthorized with the color red.

The key to the present invention is the convex parabolic mirror 1 placed at a 45-degree angle, the camera 10 will capture a series of image strips at frame rates of up to 900/sec. The image strips are stitched in direction of a single axis by the FPU 12 to create a composite image 46. The composite image is stored in the database on 12 and if required replicated on cloud servers 13 and 14 with the license plate image and converted OCR of the license plate which is the primary key. The second time the vehicle passes over the system the composite image is displayed with the previous registered composite image 45 and current scanned image 46 for comparison.

The present invention is the shape of the mirror and the angle which allows accurate video analytics and threat analysis—the way the convex mirror 1 is designed and placed at the most optimum angle, which makes the scanning unit compact and light weight with a high-resolution image 45 and 46. The system can be installed as an inground system, as an above ground or used as a portable system.

The convex mirror 1, the high frame rate camera 10 and light sources 3 are the main components of the scanning module. The ALPR camera 15 is important and ALPR data is the key for registering the vehicle license plates and for search and reporting. The FPU 12 is the database and processing unit and for larger solutions with multiple gates the cloud servers 13 and 14 is required.

The convex mirror and the high-speed camera are the critical elements of the overall invention with the software which stitches the images captured off the mirror 1 and the algorithm that does the comparison for determining and alarming if a foreign object is detected when compared with the registered image of the same vehicle. With change in technology a higher speed camera can make the invention better to capture vehicle images at higher speeds.

The convex shape of the mirror makes the unit very light, portable and compact and can be used or and installed at short notice at high threat sites. The present invention can be used for threat analysis at secure gates of sensitive and high value assets. The C-IVISS system automatically collects data regarding the vehicle and the driver and have a record of all the activities at the physical gate in a database for retrieval, review, analysis and reporting. The system is designed to compare images and alert the guard or the security personnel of any threat or non-compliance.

Additionally, the present invention can be used to inspect the undercarriage of the car in automotive manufacturing plants. Can be used to scan the vehicle under side and capture the image of the complete vehicle at car rental facility. Besides high value assets, the scanner can be used at prisons to scan a bus prior to leaving the gates. There are also commercial uses at hotels, high rise apartment buildings, shopping malls etc.

It should be understood, of course, that the foregoing relates to exemplary embodiments of the invention and that modifications may be made without departing from the spirit and scope of the invention as set forth in the following claims.

What is claimed is:

1. A vehicle inspection system for a moving vehicle, comprising:
    an enclosure having a single image capture device collecting light and images from a single mirrored surface; and
    the mirrored surface consisting of a single curved plane, wherein the image capture device captures a series of image strips from the single curved plane, wherein each image strip has a common, single axis of curvature,
    wherein the single curved plane is elongated in a horizontal direction parallel with a width of the moving vehicle, and
    wherein the moving vehicle is traveling up to twenty miles per hour when the series of image strips are being captured.

2. The system of claim 1, wherein the enclosure is dimensioned to occupy a space between an undercarriage of the moving vehicle and a surface supporting the moving vehicle.

3. The system of claim 2, wherein the mirrored surface is oriented at approximately forty-five degrees angle relative to the surface.

4. The system of claim 3, wherein the series of image strips are captured at a rate of up to 900 frames per second.

5. The system of claim 4, further comprising a field process unit coupled to the single image capture device and a user interface, wherein the series of image strips are represented on the user interface as a composite panoramic image displayed as a rectangle where the horizontal direction represents a width of said undercarriage, and wherein the composite panoramic image consists of stitching of the series of image strips having the common, single axis of curvature.

6. The system of claim 5, wherein the user interface juxtaposes a reference panoramic image adjacent to the composite panoramic image.

7. The system of claim 6, wherein the single image capture device is at a leading end of the enclosure and the mirrored surface is at a trailing end of the enclosure.

8. The system of claim 7, further comprising a ramp on each side of the enclosure.

9. The system of claim 8, further comprising a driver image provide on the user interface adjacent the composite panoramic image.

10. The system of claim 9, further comprising a license plate image on the user interface adjacent the composite panoramic image.

11. The system of claim 10, further comprising a scene image provide on the user interface adjacent the composite panoramic image.

* * * * *